(12) United States Patent
Mahlich

(10) Patent No.: US 9,451,845 B2
(45) Date of Patent: Sep. 27, 2016

(54) BREWING CHAMBER FOR A BEVERAGE PRODUCTION DEVICE

(75) Inventor: Gotthard Mahlich, Kronberg im Taunus (DE)

(73) Assignee: Nestec S.A., Vevey (CH)

( * ) Notice: Subject to any disclaimer, the term of this patent is extended or adjusted under 35 U.S.C. 154(b) by 740 days.

(21) Appl. No.: 13/980,793

(22) PCT Filed: Jan. 17, 2012

(86) PCT No.: PCT/EP2012/050599
§ 371 (c)(1),
(2), (4) Date: Aug. 12, 2013

(87) PCT Pub. No.: WO2012/098092
PCT Pub. Date: Jul. 26, 2012

(65) Prior Publication Data
US 2013/0327222 A1    Dec. 12, 2013

(30) Foreign Application Priority Data
Jan. 19, 2011 (DE) .................. 20 2011 001 661 U

(51) Int. Cl.
*A47J 31/40* (2006.01)
*A47J 31/36* (2006.01)
*A47J 31/44* (2006.01)
*A47J 31/52* (2006.01)

(52) U.S. Cl.
CPC ........... *A47J 31/407* (2013.01); *A47J 31/3628* (2013.01); *A47J 31/3676* (2013.01); *A47J 31/44* (2013.01); *A47J 31/4492* (2013.01); *A47J 31/52* (2013.01)

(58) Field of Classification Search
CPC .... A47J 31/407; A47J 31/52; A47J 31/3628; A47J 31/4492; A47J 31/3676; A47J 31/44
USPC ......... 99/279, 280, 281, 282, 283, 295, 299, 99/304, 306
See application file for complete search history.

(56) References Cited

U.S. PATENT DOCUMENTS

| | | | | |
|---|---|---|---|---|
| 2,013,172 | A * | 9/1935 | Petrone | A47J 31/52 219/507 |
| 4,133,256 | A * | 1/1979 | Lamour | A47J 31/52 99/280 |
| 8,191,463 | B2 * | 6/2012 | Spinelli | A47J 31/0668 99/280 |
| 8,836,956 | B2 * | 9/2014 | Jarisch | A47J 31/0668 356/614 |
| 2005/0015348 | A1 * | 1/2005 | Knepler | A47J 31/4492 705/76 |
| 2005/0241486 | A1 * | 11/2005 | Hug | A47J 31/402 99/275 |
| 2007/0135948 | A1 * | 6/2007 | Maase | A47J 31/52 700/86 |
| 2007/0298953 | A1 * | 12/2007 | Gavillet | A47J 31/44 493/108 |

(Continued)

FOREIGN PATENT DOCUMENTS

| | | |
|---|---|---|
| DE | 202010006556 | 8/2010 |
| WO | 2010092543 | 8/2010 |

*Primary Examiner* — Sean Michalski
(74) *Attorney, Agent, or Firm* — K&L Gates LLP

(57) ABSTRACT

The invention relates to a brewing or preparation chamber (1) of a beverage preparation device, which is suitable for receiving and extracting a portion capsule (17) filled with powdered or liquid base beverage materials and which consists, completely or partly, of electrically conductive material, and the brewing or preparation chamber (1) comprises a stationary first chamber part (2), and a second chamber part, wherein two electrically conductive contacts are arranged in the first chamber part and in the second chamber part.

12 Claims, 2 Drawing Sheets

(56) References Cited

U.S. PATENT DOCUMENTS

Figure 1:
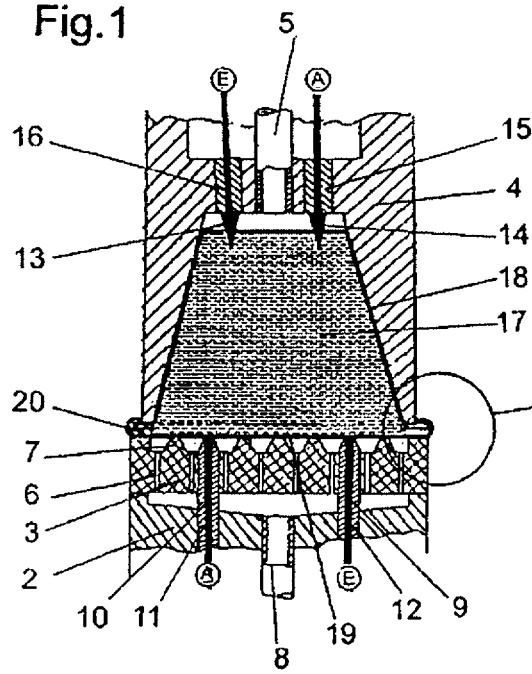

| | | | |
|---|---|---|---|
| 2010/0071562 A1* | 3/2010 | Brezovnik | A47J 31/3676 99/280 |
| 2010/0263546 A1* | 10/2010 | Leuzinger | A47J 31/3676 99/295 |
| 2013/0167733 A1* | 7/2013 | Mahlich | A47J 31/407 99/295 |
| 2013/0327222 A1* | 12/2013 | Mahlich | A47J 31/3628 99/295 |
| 2014/0272076 A1* | 9/2014 | Nevin | A47J 31/46 426/590 |
| 2014/0342069 A1* | 11/2014 | Tinkler | A47J 31/3633 426/425 |
| 2015/0201790 A1* | 7/2015 | Smith | A23F 3/18 426/431 |
| 2015/0265091 A1* | 9/2015 | Flick | A47J 31/3633 426/112 |
| 2015/0359377 A1* | 12/2015 | Graham | A47J 31/56 99/283 |
| 2016/0051079 A1* | 2/2016 | Abegglen | A47J 31/3623 426/394 |

* cited by examiner

BREWING CHAMBER FOR A BEVERAGE PRODUCTION DEVICE

CROSS REFERENCE TO RELATED APPLICATIONS

The present application is a National Stage of International Application No. PCT/EP2012/050599, filed on Jan. 17, 2012, which claims priority to German Patent Application No. 20 2011 001 661.7, filed Jan. 19, 2011, the entire contents of which are being incorporated herein by reference.

The invention relates to a brewing or preparation chamber for a beverage preparation device, which is suitable for receiving and extracting a portion capsule filled with powdered or liquid base beverage materials and which consists, completely or partly, of electrically conductive material.

Beverage preparation devices, in particular espresso machines, are increasingly designed for the use of portion capsules which are filled with a specific quantity of powdered or liquid beverage base materials. The most common portion capsules either comprise a deep-drawn pot made of aluminium foil which is closed in an air-tight and odour-tight manner with a lid closing element made of aluminium foil, or a deep-drawn pot made of plastic film or a plastic pot produced in the plastic injection moulding process, which is closed in an air-tight and odour-tight manner with a lid closing element made of aluminium foil or plastic film.

The beverage preparation devices which are suitable for receiving and extracting such a portion capsule are equipped with a brewing or preparation chamber which preferably comprises a stationary first chamber part, which is provided with opening means for the outlet of the beverage and is connected in a fluid-conducting manner to a structure for the beverage to flow out, and a second chamber part which can be moved horizontally or vertically with respect to the first chamber part, is connected in a fluid-conducting manner to an assembly which feeds in the extraction liquid in order to supply the portion capsule with the extraction liquid and is provided with at least one piercing means for opening the portion capsule and for introducing the extraction liquid into the portion capsule, the brewing or preparation chamber being opened to receive a portion capsule and closed to extract the portion capsule.

For the brewing operation, the piercing means puncture the portion capsule, either on the side closed with the film or on its bottom side, and the extraction liquid pumped under pressure into the brewing chamber is then able to flow into the portion capsule through the openings pierced by the piercing means. In order for the beverage produced to run out, the portion capsule is opened on the side opposite to the extraction liquid feed side, according to the respective portion capsule system.

In the case of portion capsules which are produced from an aluminium foil and are closed with a lid closing element made of aluminium foil, the aluminium closing foil rests on the tips of a pyramid plate arranged on the bottom of the brewing chamber and, by means of the pressure built up in the portion capsule by the extraction liquid flowing into the portion capsule under pump pressure, the aluminium closing foil is pressed against the pyramid tips in such a manner that the foil is pierced by the pyramid tips and therefore the portion capsule is opened. The aluminium closing foil is designed for a specific bursting pressure, which means that, before the pyramid tips pierce through the closing film, in particular during the preparation of an espresso, optimum moistening and application of pressure to the coffee granules is achieved, which is important for optimal foam formation, the quality feature for a good espresso. Following the opening of the portion capsule, the coffee liquid flows out of the brewing chamber via outlet channels.

Portion capsules of which the capsule bodies are produced from a plastic film or in the plastic injection moulding process and which are closed with an aluminium foil can likewise be opened by means of a pyramid plate or, depending on the system, by means of a portion capsule opening mandrel arranged on the bottom of the brewing or preparation chamber.

In the case of brewing or preparation chamber systems which are designed for the use of portion capsules consisting of an aluminium foil and which are closed with a lid closing element made of aluminium foil, there is the risk that use will be made of portion capsules that are not intended for the system and consist completely or completely of plastic but partly or largely correspond to the configuration of the original portion capsule and are therefore accepted by the receiving device of the brewing or preparation chamber. As a result of the different construction of the brewing or preparation chambers necessitated by the system, for portion capsules consisting of an aluminium foil, as compared with brewing or preparation chambers for portion capsules consisting of non-metallic material, in the event that use is made of portion capsules consisting completely or partly of plastic, this may lead to considerable operational faults in the beverage preparation device or to low-quality preparation results. In order to avoid such misuse, WO 2010/092543 A2 and DE 202010006556.9 U1 propose electrical testing systems for the preparation devices which, in the event of a lack of electric conductivity of the portion capsule body or the closing foil, detect a capsule that is not intended for the system and stop the preparation device being started. There, in the testing arrangement in which the electric passage between the electrically conductive capsule body and the electrically conductive closing foil is used as a detection criterion, both applications assume that the closing foil and the capsule body are electrically conductively and directly conductively connected to each other. In the case of portion capsules in which there is no electrically conductive contact between the electrically conductive capsule body and the electrically conductive closing foil, for example when use is made of an electrically non-conductive seal or another electrically non-conductive intermediate layer arranged between the capsule body and the closing foil, this testing arrangement is ineffective.

The present invention is based on the object of equipping the brewing or preparation chamber, which is suitable for receiving a portion capsule consisting completely or partly of aluminium or an electrically conductive material, with a testing and control device which accepts only portion capsules the capsule bodies and the closing foil of which consist completely or partly of aluminium foil or an electrically conductive material, and prevents a preparation cycle when a portion capsule not intended for the system is used.

According to the invention, the object is achieved by a brewing or preparation chamber, which is formed from a first and a second chamber part, is suitable for receiving a portion capsule consisting completely or partly of aluminium or an electrically conductive material, and which, in its first and its second chamber part, is equipped with electrically conductive contacts which are part of an interrupted control current loop for a testing and control device and which are suitable to test whether a portion capsule belongs to the brewing or preparation chamber according to the invention.

The testing operation is carried out in such a way that the electric starting pulse for a beverage preparation cycle is led via a control current loop to a control device which, after it has been activated, starts the preparation cycle, this control current loop for the testing and control device leading via electric contacts which are arranged in the first chamber part and in the second chamber part of the brewing and preparation chamber and are electrically insulated with respect to one another and with respect to the chambers, and the said loop being made only by means of a portion capsule, lying in the brewing or preparation chamber, of which the closing foil and the capsule body are completely or partly electrically conductive, as a result of the fact that the electric contacts which are arranged in the first and second chamber part of the brewing or preparation chamber and which are part of the control current loop of the control device are in electrically conductive contact with the electrically conductive closing foil and the electrically conductive capsule body or conductive zones of the capsule body when the brewing or preparation chamber is closed.

The invention will be illustrated below by using 6 figures:

FIG. 1 shows, in schematic form, partly sectioned, a brewing or preparation chamber 1 according to the invention, comprising a first chamber part 2 having a pyramid plate 3 with outlet holes 6, and two electric contacts 9; 10 which are electrically insulated with respect to each other and with respect to the first chamber part, and a further chamber part 4 having an extraction liquid feed structure 5 and two piercing means 13; 14, which are formed as electric contacts electrically insulated from each other and with respect to the second chamber part 4, and a portion capsule 17 lying in the closed brewing chamber and having an electrically conductive capsule body 18 and an electrically conductive closing foil 19 and an electrically non-conductive seal 20 arranged between the capsule body 18 and the closing foil 19, the electric contacts 9; 10 of the first chamber part 2 being stuck into the chamber body 18 in contact with the closing foil 19 and the electric contacts 13, 14 of the second chamber part 4.

Figure 1A:
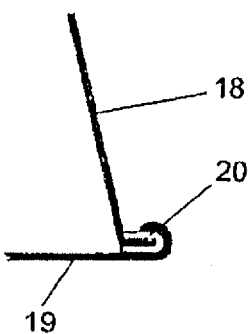

FIG. 1a shows, in schematic form, sectioned and enlarged, a detail from the connection of the capsule body 18 to a closing foil 19 by means of an electrically non-conductive seal 20 lying between the capsule body 18 and the closing foil 19.

Figure 2:
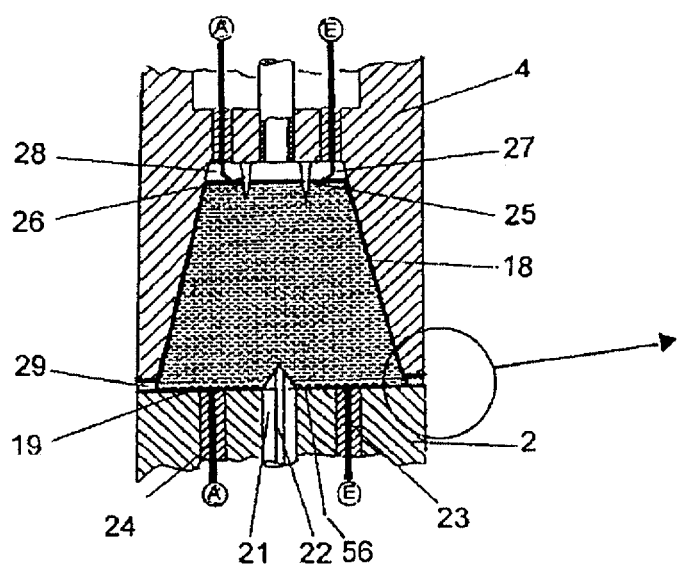

FIG. 2 shows, in schematic form, partly sectioned, a brewing or preparation chamber 1 according to the invention, comprising a first chamber part 2 having an opening mandrel 21 with an outlet structure 22 and two electric contacts 23; 24 electrically insulated with respect to each other and with respect to the first chamber part 2, and a second chamber part 4 having an extraction liquid feed structure 5 and two piercing means 25, 26 and two electric contacts 27; 28 electrically insulated with respect to each other and with respect to the second chamber part 4, and a portion capsule 17 lying in the brewing chamber 1 and having an electrically conductive capsule body 18 and an electrically conductive closing foil 19 and an electrically non-conductive intermediate layer 29 arranged between the capsule body 18 and the closing foil 19, the contacts 23, 24 of the first chamber part 2 being in contact with the closing foil 19 and the contacts 27; 28 of the second chamber part 4 being in contact with the capsule body 18.

Figure 2A:
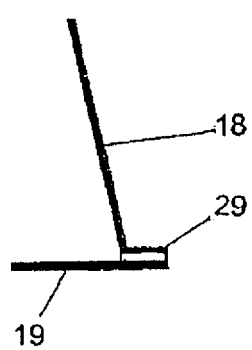

FIG. 2a shows, in schematic form, sectioned and enlarged, a detail from the connection of the capsule body 18 to a closing foil 19 by means of an electrically non-conductive intermediate layer 29 lying between the capsule body 18 and the closing foil 19.

Figure 3:
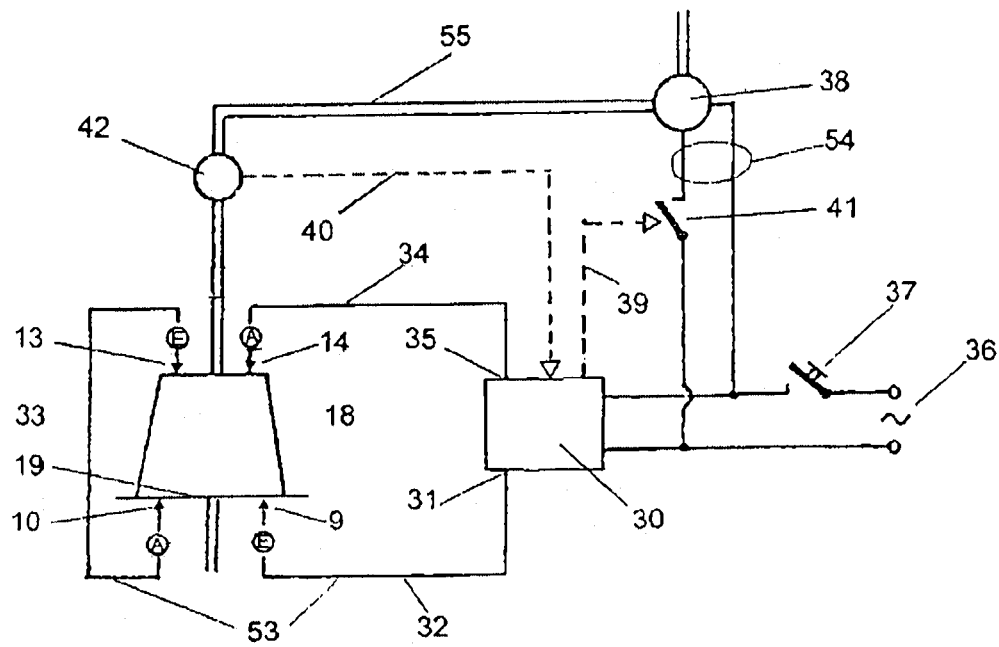

FIG. 3 shows, in schematic form, a testing and control circuit having a series test current loop 53 for the conductivity of the closing foil 19 and of the capsule body 18.

Figure 4:
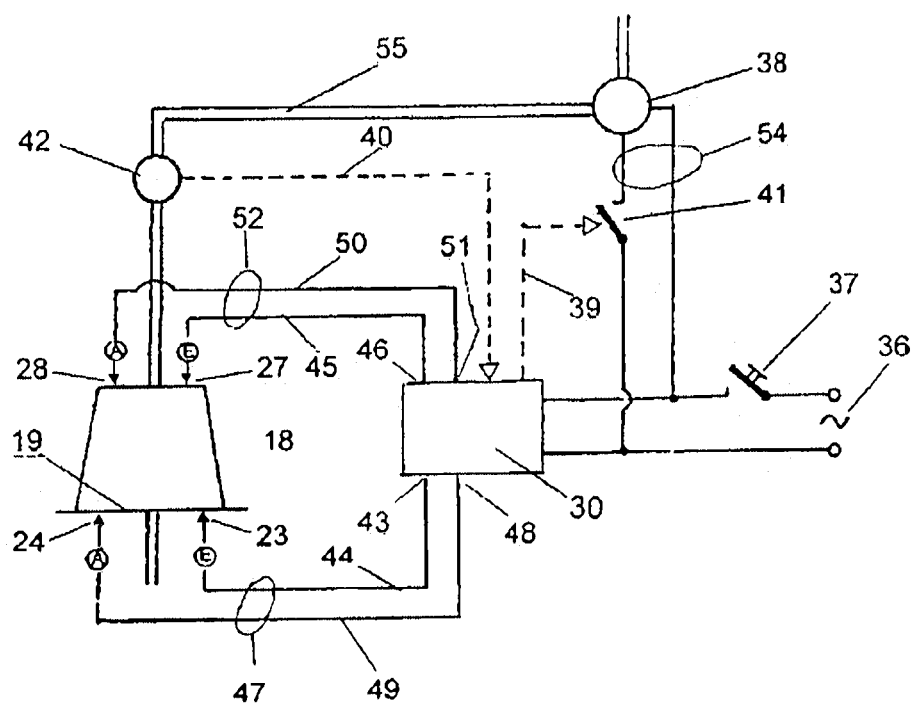

FIG. 4 shows, in schematic form, a testing and control circuit having two separate test current loops 47, 52 for the conductivity of the closing foil 19 and the capsule body 18.

In the various figures, the same parts are always provided with the same reference symbols and, as a rule, will therefore also be named or mentioned only once in each case. Exemplary embodiments of the invention are illustrated in the figures and explained in more detail in the following description. The figures are described merely by way of example and do not restrict the general idea of the invention.

In a preferred embodiment of the invention, in which the first chamber part 2 of the brewing or preparation chamber 1 is equipped with a pyramid plate 3 having pyramid tips 7 which serve to open the portion capsule 17, at least one electrically conductive input contact 9 and at least one electrically conductive output contact 10 are arranged in the pyramid plate 3 and are insulated electrically with respect to each other and with respect to the pyramid plate 3, and at least two piercing means 13, 14, which serve to open the capsule for the extraction liquid to run into the capsule, are formed as electrically conductive contacts 13, 14 and are insulated electrically with respect to each other and with respect to the second chamber part 4, are arranged in the second chamber part 4, at least one piercing means 13 being provided as input contact and at least one piercing means 14 being provided as output contact.

When a portion capsule 17 is lying in the closed brewing chamber 1, the electrically conductive closing foil 19 of the portion capsule 17 rests on the electrically conductive contacts 9; 10 of the pyramid plate 3 and, when the brewing chamber 1 is closed, the piercing means 13, 14 of the second chamber part 4 puncture the portion capsule 17 and are therefore in electrically conductive contact with the electrically conductive capsule body 18 or electrically conductive zones of the capsule body 18. An input contact 9 of the first chamber part 2 is electrically conductively connected via the connecting line 32 to a test voltage output 31 of a control device 30, and an output contact 10 of the first chamber part 2 is permanently connected via the connecting line 33 to an input contact 13 of the second chamber part 4. An output contact 14 of the second chamber part 4 is electrically conductively connected via the connecting line 34 to the test voltage input 35 of the control device 30 and, as soon as the brewing chamber 1 with a portion capsule 17 lying inside is closed, by means of the electrically conductive closing foil 19 and the electrically conductive capsule body 18 or the electrically conductive zones of the latter, the test current loop 53, which comprises the series connection of test voltage output 31, connecting line 32, input contact 9, conductive closing foil 19, connecting line 33, input contact 13, conductive capsule body 18, output contact 14, connecting line 34 and test voltage input 35, is made.

In a further embodiment of the invention, the input contact 23 of the first chamber part 2 is connected via the connecting line 44 to a first test voltage output 43 of a control device 30, and an output contact 24 of the first chamber part 2 is connected via the connecting line 45 to a first test voltage input 46 of the control unit 30, and an input contact 27 of the second chamber part 4 is connected via the connecting line 49 to a second test voltage output 48 of the control device 30, and an output contact 28 of the second chamber part 4 is connected via the connecting line 50 to a second test voltage input 51 of the control device 30. When there is a portion capsule 17 lying in the closed brewing chamber 1, the two separate test current loops 47; 52 are therefore made by means of the electrically conductive closing foil 19 and the electrically conductive capsule body 18 or the conductive zones of the latter, and are evaluated in the control unit 30 as an AND circuit.

Then, by means of closing the mains switch 37 for the power supply of the preparation device, the control device 30 is also connected to the supply voltage 36 and, when the test current loop 47, 52, 53 for the control device 30 are made, the control device 30 outputs the starting signal via the line 39 to close the start contact 41, which closes the supply current loop 54 for the extraction liquid pump 38, and the beverage preparation operation starts.

The flowmeter 42 located in the extraction liquid line 55 measures the quantity of extraction liquid flowing through and, when the pre-programmed quantity is reached, outputs a stop signal via the stop signal line 40 to the testing and control device 30, and the latter opens the current loop 54 for the extraction liquid pump 38 via the line 39.

Depending on the system, the opening of the portion capsule 17 can also be carried out by means of an opening mandrel 21 arranged on the bottom 56 of the first chamber 2, the electric contacts 9, 10 likewise being arranged in the chamber bottom 56.

Likewise, the extraction liquid feed 55 into the portion capsule 17 can be carried out by separate piercing means 25, 26 of the second chamber part 4 or by means of a pre-perforated portion capsule bottom, the electric contacts 27; 28 of the second chamber part 4 being formed as touching contacts with respect to the capsule body 18 or the electrically conductive zones of the latter. Likewise possible is an embodiment of the brewing or preparation chamber in which the first chamber part is equipped with a pyramid plate and the second chamber part is equipped with touching contacts, or a brewing or preparation chamber the first chamber part of which is provided with an opening mandrel and which is provided in the second chamber part with piercing elements formed as electric contacts. The electric circuit arrangements described for the evaluation of the control signal obtained by means of the electric contacts of the first and second chamber part and of the electrically conductive capsule body or electrically conductive zones of the portion capsule and the closing foil represent only examples of various possible evaluation circuits, and the control current loops 47, 52, 53 for the control device 30 can be both alternating current loops and direct current loops.

LIST OF REFERENCE SYMBOLS

1 Brewing or preparation chamber
2 First chamber part
3 Pyramid plate
4 Second chamber part
5 Extraction liquid feed
6 Beverage outlet holes
7 Pyramid tips
8 Beverage outlet
9 Electric input contact
10 Electric output contact
11 Insulation
12 Insulation
13 Electric input contact
14 Electric output contact
15 Insulation
16 Insulation
17 Portion capsule
18 Portion capsule body
19 Closing foil
20 Seal
21 Opening mandrel
22 Outlet structure
23 Electric input contact
24 Electric output contact
25 Opening means
26 Opening means
27 Electric input contact
28 Electric output contact
29 Electrically insulating intermediate layer
30 Control device
31 Test voltage output
32 Connecting line
33 Connecting line
34 Connecting line
35 Test voltage input
36 Supply network
37 Mains switch
38 Pump for extraction liquid
39 Start line
40 Stop line
41 Pump start contact
42 Flowmeter
43 First test voltage output
44 Connecting line
45 Connecting line
46 First test voltage input
47 First test current loop
48 Second test voltage output
49 Connecting line
50 Connecting line
51 Second test voltage input
52 Second test current loop
53 Test current loop
54 Pump current loop
55 Extraction liquid line
56 Chamber part bottom (first chamber part)

The invention claimed is:

1. A brewing or preparation chamber of a beverage preparation device, which is suitable for receiving and extracting a portion capsule filled with powdered or liquid base beverage materials and which comprises, completely or partly, of electrically conductive material, and the brewing or preparation chamber comprises: a stationary first chamber part, which is provided with an opener for opening the portion capsule for the outlet of the beverage and is connected in a fluid-conducting manner to a structure for the beverage to flow out, and a second chamber part which can be moved horizontally or vertically with respect to the first chamber part, is connected in a fluid-conducting manner to an assembly which feeds in the extraction liquid in order to supply the portion capsule with the extraction liquid and is provided with at least two piercing members for opening the portion capsule and for introducing the extraction liquid into the portion capsule, the brewing or preparation chamber being opened to receive a portion capsule and closed to extract the portion capsule; and in each case at least two electrically conductive contacts electrically insulated with respect to each other and with respect to the chamber parts are arranged in the first chamber part and in the second chamber part, and when there is a portion capsule lying in the closed brewing or preparation chamber, the electrically conductive contacts of the first chamber part are in electrically conductive contact with the electrically conductive capsule closing foil, and the electrically conductive contacts of the second chamber part (4) are in electrically conductive contact with the electrically conductive capsule body or electrically conductive zones of the capsule body, and an input contact of the first chamber part is electrically conductively connected to the test voltage output of a control device, and an output contact of the first chamber part is conductively connected to an input contact of the second chamber part, and an output contact of the second chamber part is conductively connected to the test voltage input of the control device, and the test current loop is made by the electrically conductive closing foil and the electrically conductive capsule body or the electrically conductive zones of the latter.

2. Brewing or preparation chamber according to claim 1, wherein the piercing member is arranged in the second chamber part is formed as an electric contact.

3. Brewing or preparation chamber according to claim 1, wherein the electric contacts arranged in the second chamber part are formed as touching contacts.

4. Brewing or preparation chamber according to claim 1, wherein the electric contacts arranged in the first chamber part are formed as touching contacts.

5. Brewing or preparation chamber according to claim 1, wherein the piercing member is arranged in the first chamber part, and the opener is arranged in the second chamber part.

6. Brewing or preparation chamber according to claim 1, wherein the control device is equipped with a switch for activating the preparation process.

7. A brewing or preparation chamber of a beverage preparation device, which is suitable for receiving and extracting a portion capsule filled with powdered or liquid base beverage materials and which comprises, completely or partly, of electrically conductive material, and the brewing or preparation chamber comprises: a stationary first chamber part, which is provided with opener for opening the portion capsule for the outlet of the beverage and is connected in a fluid-conducting manner to a structure for the beverage to flow out, and a second chamber part which can be moved horizontally or vertically with respect to the first chamber part, is connected in a fluid-conducting manner to an assembly which feeds in the extraction liquid in order to supply the portion capsule with the extraction liquid and is provided with at least two piercing members for opening the portion capsule and for introducing the extraction liquid into the portion capsule, the brewing or preparation chamber being opened to receive a portion capsule and closed to extract the portion capsule; and an input contact of the first chamber part is electrically conductively connected to a first test voltage output of a control device, and an output contact of the first chamber part is electrically conductively connected to a first test voltage input of the control unit, and an input contact of the second chamber part is electrically conductively connected to a second test voltage output of the control device, and an output contact of the second chamber part is electrically conductively connected to a second test voltage input of the control device, and the two test current loops are made by the electrically conductive closing foil and the electrically conductive capsule body or the electrically conductive zones of the latter and form an AND circuit in the control unit.

8. Brewing or preparation chamber according to claim 7, wherein the piercing member is arranged in the second chamber part is formed as an electric contact.

9. Brewing or preparation chamber according to claim 7, wherein the electric contacts arranged in the second chamber part are formed as touching contacts.

10. Brewing or preparation chamber according to claim 7, wherein the electric contacts arranged in the first chamber part are formed as touching contacts.

11. Brewing or preparation chamber according to claim 7, wherein the piercing member is arranged in the first chamber part, and the opener is arranged in the second chamber part.

12. Brewing or preparation chamber according to claim 7, wherein the control device is equipped with a switch for activating the preparation process.

* * * * *